United States Patent
Mascaro et al.

(10) Patent No.: US 10,627,862 B1
(45) Date of Patent: *Apr. 21, 2020

(54) HEAT DISSIPATING STRUCTURES AND MOBILITY APPARATUS FOR ELECTRONIC HEADSET FRAMES

(71) Applicants: Guy A Mascaro, Indianapolis, IN (US); Mark Gamache, Zionsville, IN (US); Matthew Kevin Walsh, New Palestine, IN (US)

(72) Inventors: Guy A Mascaro, Indianapolis, IN (US); Mark Gamache, Zionsville, IN (US); Matthew Kevin Walsh, New Palestine, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,848

(22) Filed: Jun. 7, 2019

Related U.S. Application Data

(63) Continuation of application No. 16/112,733, filed on Aug. 26, 2018, now Pat. No. 10,317,942, which is a continuation of application No. 15/704,922, filed on Sep. 14, 2017, now Pat. No. 10,088,867, which is a continuation of application No. 15/479,026, filed on Apr. 4, 2017, now abandoned.

(60) Provisional application No. 62/318,141, filed on Apr. 4, 2016, provisional application No. 62/318,554, filed on Apr. 5, 2016.

(51) Int. Cl.
  *G06F 1/16* (2006.01)
  *G06F 1/20* (2006.01)

(52) U.S. Cl.
  CPC ............ *G06F 1/163* (2013.01); *G06F 1/1637* (2013.01); *G06F 1/203* (2013.01)

(58) Field of Classification Search
  CPC ......... G06F 1/163; G06F 1/1637; G06F 1/203
  See application file for complete search history.

(56) References Cited

U.S. PATENT DOCUMENTS

| | | | | |
|---|---|---|---|---|
| 5,671,037 A * | 9/1997 | Ogasawara | ........ | G02B 27/0176 2/421 |
| 6,021,044 A * | 2/2000 | Neville, Jr. | ................ | G06F 1/20 165/104.33 |
| 6,034,653 A | 3/2000 | Robertson et al. | | |
| 6,421,031 B1 * | 7/2002 | Ronzani | ................ | G02B 27/017 345/8 |
| 7,542,012 B2 * | 6/2009 | Kato | ................... | G02B 27/0176 345/8 |
| 8,416,153 B2 * | 4/2013 | Yoshikawa | ........ | G02B 27/0172 345/7 |
| 8,994,610 B2 * | 3/2015 | Tricoukes | ............... | H04R 1/105 345/8 |
| 9,289,011 B2 * | 3/2016 | Junker | .................. | A24B 15/241 |
| 9,503,555 B2 * | 11/2016 | Tricoukes | ............... | H04M 1/05 |
| 9,645,396 B2 * | 5/2017 | Andes | ................... | G02B 27/017 |
| 2002/0149545 A1 * | 10/2002 | Hanayama | ........... | G02B 27/017 345/7 |
| 2006/0238878 A1 * | 10/2006 | Miyake | .............. | G02B 27/0176 359/630 |

(Continued)

*Primary Examiner* — Daniel P Wicklund
*Assistant Examiner* — Christopher L Augustin
(74) *Attorney, Agent, or Firm* — Roberts IP Law; John Roberts

(57) ABSTRACT

A heat sink for electronic devices, such as wearable displays, dissipates heat away from and electrical component, such as a microprocessor. An adjustable support assembly permits adjustment of a visual display relative to a user's field of view.

20 Claims, 15 Drawing Sheets

(56) References Cited

U.S. PATENT DOCUMENTS

2013/0176626 A1  7/2013  Joseph et al.
2017/0052802 A1* 2/2017  Ko .................... G06F 9/44505

* cited by examiner

HEAT DISSIPATING STRUCTURES AND MOBILITY APPARATUS FOR ELECTRONIC HEADSET FRAMES

CROSS REFERENCE TO RELATED APPLICATION

The present application is a continuation of U.S. application Ser. No. 16/112,733, filed Aug. 26, 2018, which is a continuation of U.S. application Ser. No. 15/704,922, filed Sep. 14, 2017, which is a continuation of U.S. application Ser. No. 15/479,026, filed Apr. 4, 2017, and claims the benefit of U.S. Provisional Application No. 62/318,141, filed Apr. 4, 2016 and U.S. Provisional Application No. 62/318,554, filed Apr. 5, 2016, the disclosures of which are hereby incorporated by reference in their entireties.

FIELD OF THE DISCLOSURE

The present disclosure relates to electronic devices including a frame configured to be worn on the head of a user.

BACKGROUND OF THE DISCLOSURE

Electronic headset frames, such as Google® Glass Enterprise Edition visual display, serve as an optical display designed as a pair of glasses to be mounted to the head of a user. These electronic headset frames are capable of not only displaying images, but also recording the visuals of a user. These electronic headset frames may include an arm or "pod" which houses components such as the microprocessor, which are subject to overheating after a period of time due to the heat generated by electronic chips in the microprocessor which cause the device to either malfunction or shut off. Additionally, these electronic headset frames are currently provided via immobile eyeglasses which restrict the user's vertical field of view.

BRIEF SUMMARY OF THE DISCLOSURE

According to one aspect of the present disclosure, a wearable display is provided. The wearable display includes a headset configured to be worn by a user and a visual display assembly including a support body supported by the headset and a visual display supported by the support body to be positioned forward of a user's eye wearing the headset. The wearable display further includes an electrical component in communication with the visual display and a heat sink in thermal communication with the electrical component. The heat sink includes a base positioned to receive heat from the electrical component and a plurality of heat fins in thermal communication with the base to dissipate heat from the electrical component into the environment.

According to another aspect of the present disclosure, a wearable display is provided that includes a headset configured to be worn by a user and a visual display assembly including a support body supported by the headset and a visual display supported by the support body to be positioned forward of a user's eye wearing the headset. The wearable display further includes an adjustable support assembly coupling the support body to the headset in one of a plurality of positions.

Additional features of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The aforementioned aspects and many of the intended features of this disclosure will grow to be appreciated at a greater level once references to the following accompanying illustrations are expounded upon.

Figure 1:
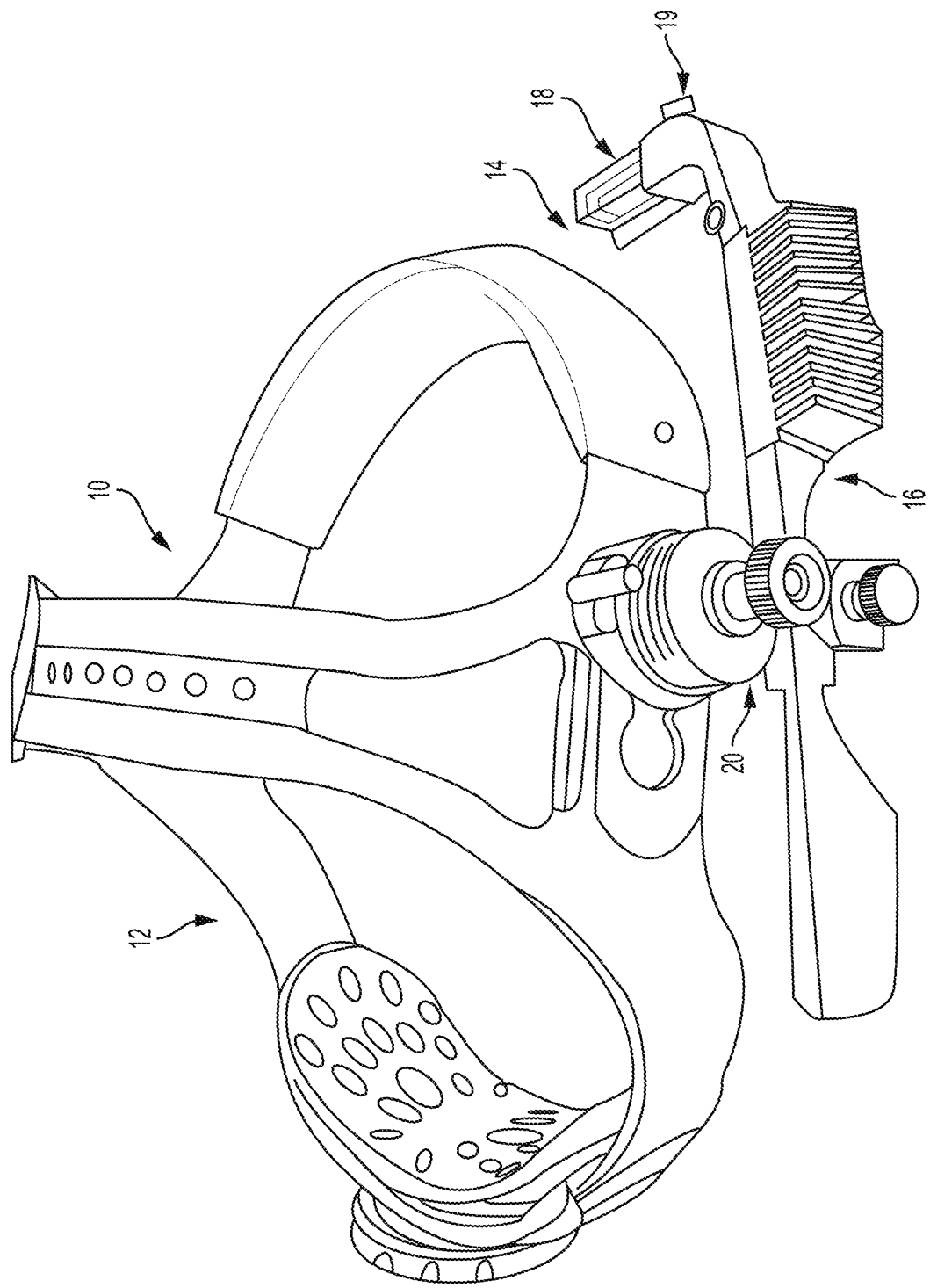
FIG. 1 is an overall view of wearable display including a headset and a visual display positionable in a user's field of vision.

Equivalent reference components point to corresponding parts throughout the several views. Unless otherwise indicated, the components shown in the drawings are proportional to each other. Wherein, the illustrations depicted are manifestations of the disclosure, and such illustrations shall in no way be interpreted as limiting the scope of the disclosure.

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

DETAILED DESCRIPTION OF THE DRAWINGS

According to the present disclosure, a wearable display 10 is provided that includes a headset 12 positionable on a user's head (not shown) and visual display assembly 14, also referred to as a glass pod 14. Glass pod 14 includes a support body 16 coupled to headset 12 that wraps around the side of a user's head to a position in front of the user's field of view. Glass pod 14 further includes a visual display 18 supported by support body 16 positioned in the users field of view. Visual display 18 is preferably transparent and configured to display images, data, etc. in the user's field of view. Glass pod 14 is preferably a Google® Enterprise Edition visual display. Additional details of suitable visual display assemblies are provided in U.S. Pat. No. 8,493,204 and U.S. Patent Publication Nos 2013/0069850; 2013/0258270, and 2013/0235331, the entire disclosures of which are incorporated by reference herein. According to alternative embodiments, other headset configurations may be provided, such as glasses and other headset configurations known to those of ordinary skill in the art.

Glass pod 14 is connected to headset 12 with an adjustable support assembly 20. Support assembly 20 allows a user to adjust the position of visual display 18. In one embodiment, glass pod 14 can be rotated to be within the user's field of view; however, in other embodiments, glass pod 14 can be rotated to be inside and outside of the user's field of view or a multitude of other angles relative to the user's range of head motions, preferably within a 360 degree radius.

Glass pod 14 includes several electrical components that provide power, communications, processing, and otherwise support the features of glass pod 14. For example, glass pod 14 includes a battery 22 positioned inside support body 16, a microprocessor/CPU 24, a camera 19 (shown extended from its normal position in FIG. 1), a touchpad (not shown), a speaker (not shown), and a microphone (not shown). Often, such electrical components generate heat. On occasion, if such heat is not dissipated away from the electrical component at a sufficient rate, the electrical component may heat up too much. To avoid component failure and/or other issues, the electronic components may be partially or fully disabled to eliminate and/or reduce the heat generation. When disabled, a particular feature(s) of glass pod 14 may be disabled. To facilitate dissipation of heat away from one or more of the electrical components and to maintain functionality, glass pod 14 is provide with a heat sink 26 as shown in FIG. 1.

Figure 2:
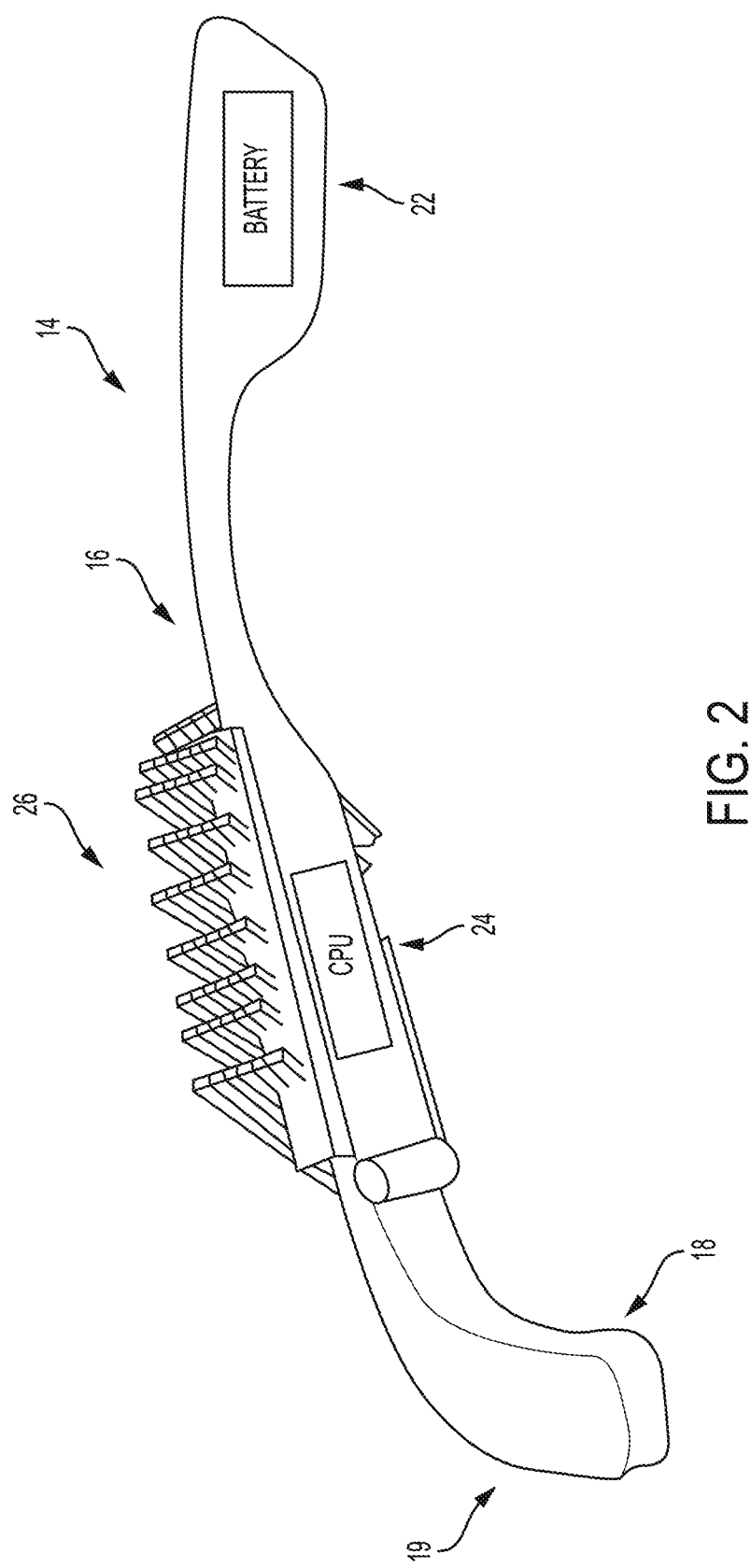
FIG. 2 is a perspective view of the visual display showing a heat sink coupled to the visual display.

As shown in FIGS. 1 and 2, heat sink 26 is coupled to an outer side of glass pod 14, forward of a user's ear when worn by a user. Heat sink 26 is positioned to receive heat from microprocessor 24 and to dissipate the heat away from microprocessor 24 and preferably away from the user. According to the preferred embodiment, heat sink 24 is made of aluminum. According to other embodiments, heat sink 24 may be made of other metals and other materials having high thermal conductivity.

Figure 3:
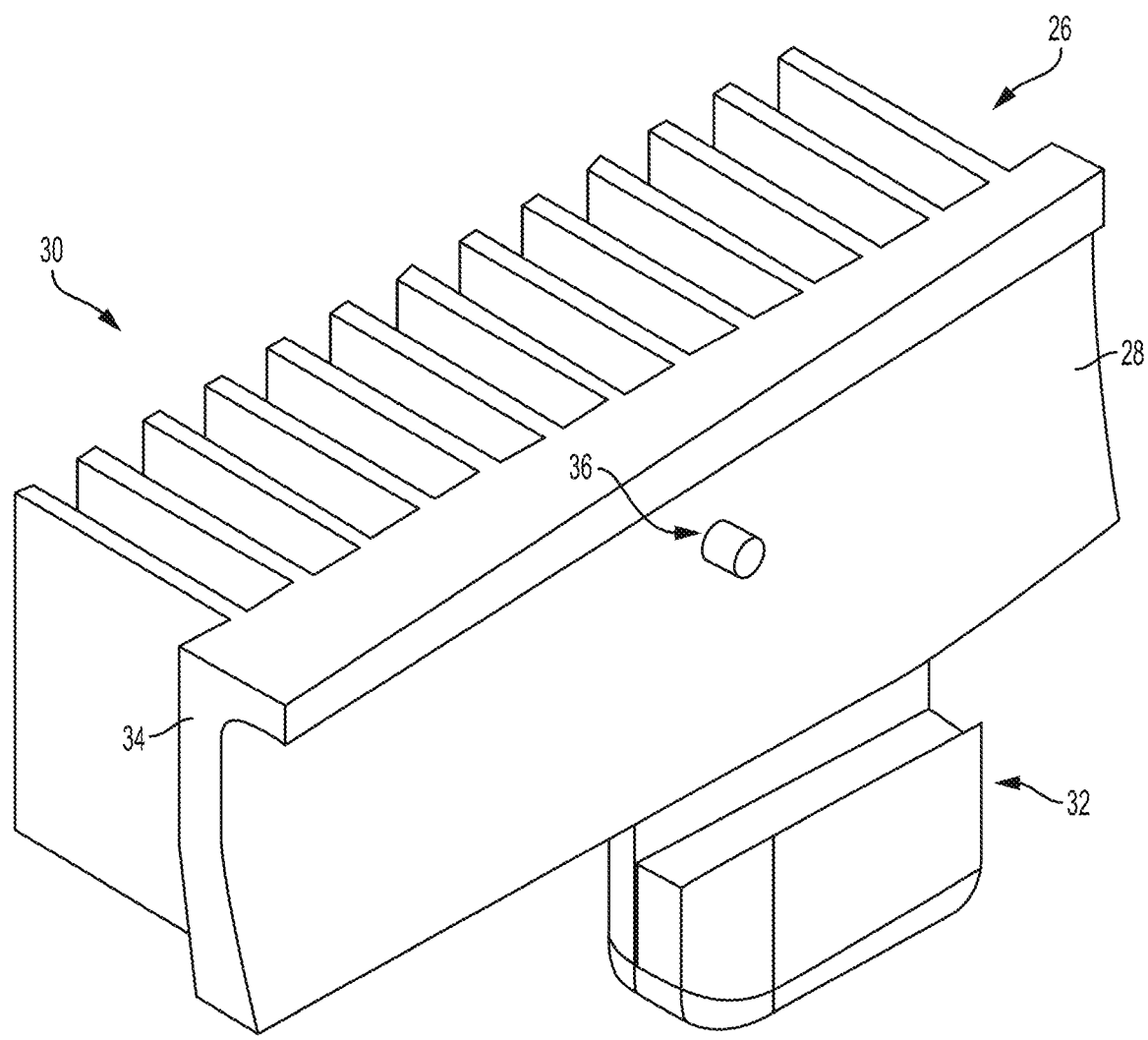
FIG. 3 is a perspective view of the heatsink of FIG. 2 showing the heatsink including a plurality of heat fins and tab that provides a cradle.
Figure 4:
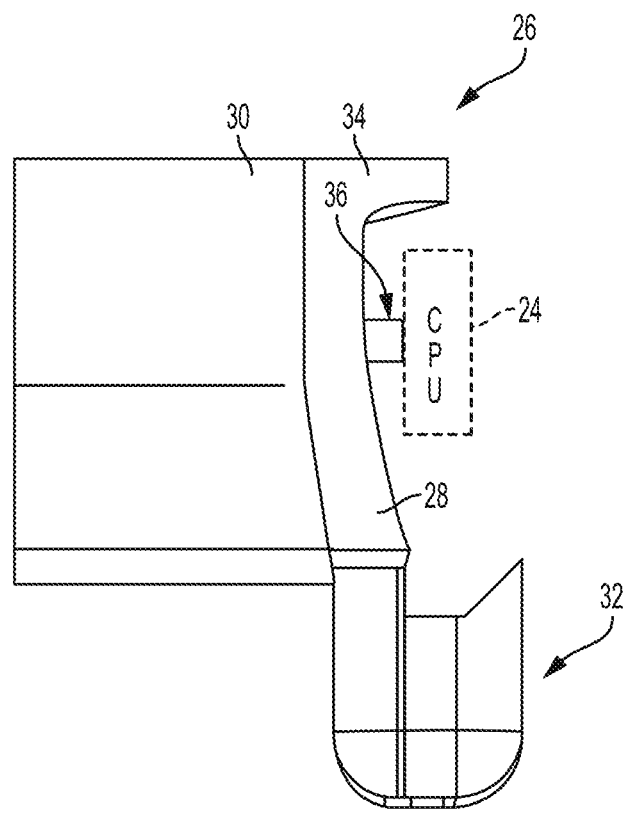
FIG. 4 is an end view of the heat sink of FIG. 2 showing the cradle.

As shown in FIG. 3, heat sink 26 includes a base 28, a plurality of heat fins 30, a communications tab 32, an upper lip 34, and a heat transfer extension 36. As shown in FIGS. 3 and 4, base 28 is contoured to match an outer profile of support assembly 20. During assembly, base 28 is adhered to support assembly 20 with a thermally conductive adhesive. Upper lip 34 is positioned on top of support assembly 20 and transitions from wider to narrower to match a thickness of support assembly 20. Upper lip 34 may also be adhered to support structure with thermally conductive adhesive. Preferably, the thermally conductive adhesive has a thermal conductivity greater than the thermal conductive of the material of support assembly 20.

As shown in FIGS. 3 and 4, heat transfer extension 36 is substantially cylindrical and positioned in contact, preferably direct contact, with CPU 24 to facilitate the transfer of heat from CPU 24 to base 28. In the embodiment, plastic support assembly 20 of pod 14 that protects CPU 24 is drilled to include a small hole (not shown) that receives extension 26 to contact CPU 24. Upon such contact and use of CPU 24, the heat that comes from CPU 24 is then transferred to extension 22 and into base 28, and then released through base 28 and primarily through heat fins 30. CPU 24 may also be connected to extension 22 by using a thermal adhesive.

Figure 5:
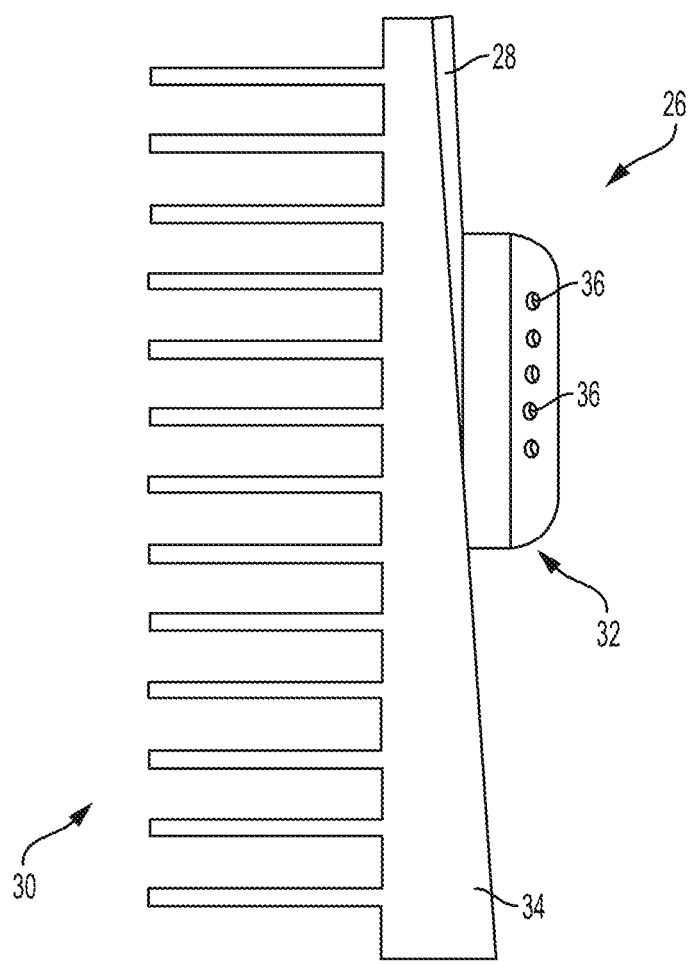
FIG. 5 is a top plan view of the heat sink showing the heat sink including a plurality of connections in the tab to communicate with electrical components of the visual display.
Figure 6:
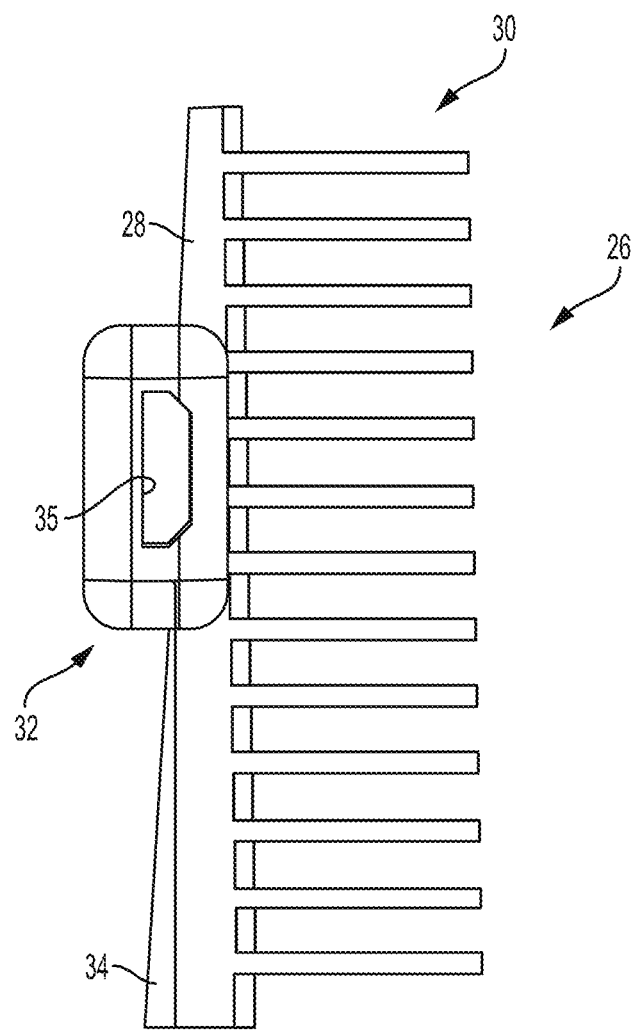
FIG. 6 is a bottom view of the heat sink of FIG. 2 showing the tab including a micro USB port.
Figure 7:
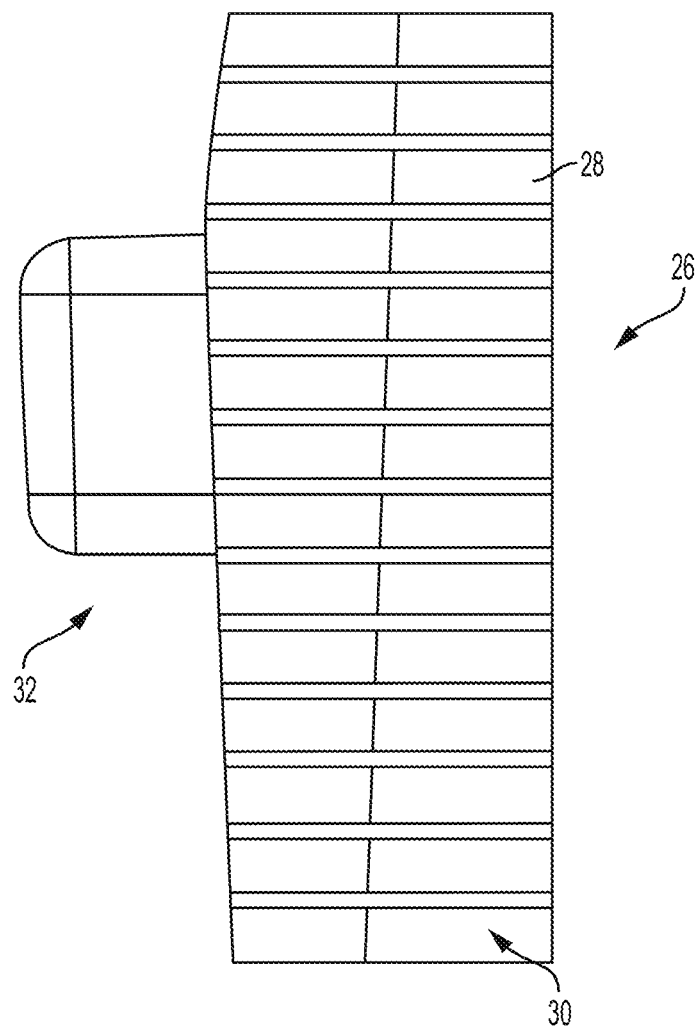
FIG. 7 is an elevation view of the heat sink of FIG. 2.
Figure 8:
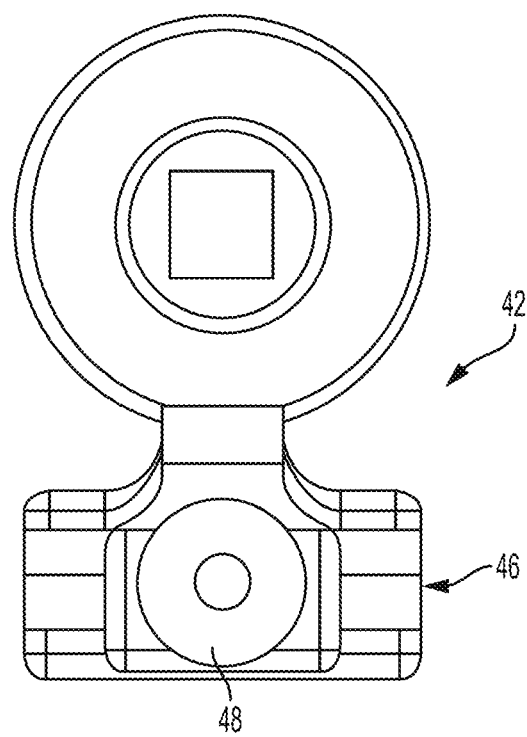
FIG. 8 is a top view of the clamping structure of the mobility apparatus including a view of the square hole.
Figure 9:
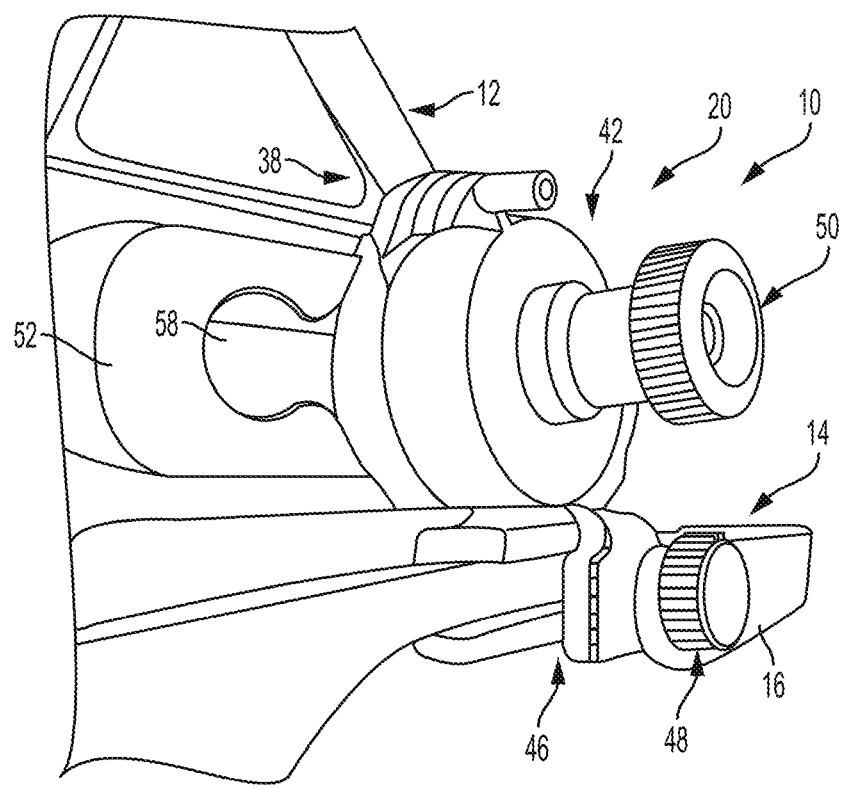
FIG. 9 is a perspective view of an adjustable support assembly that couples the visual display to the headset.
Figure 10:
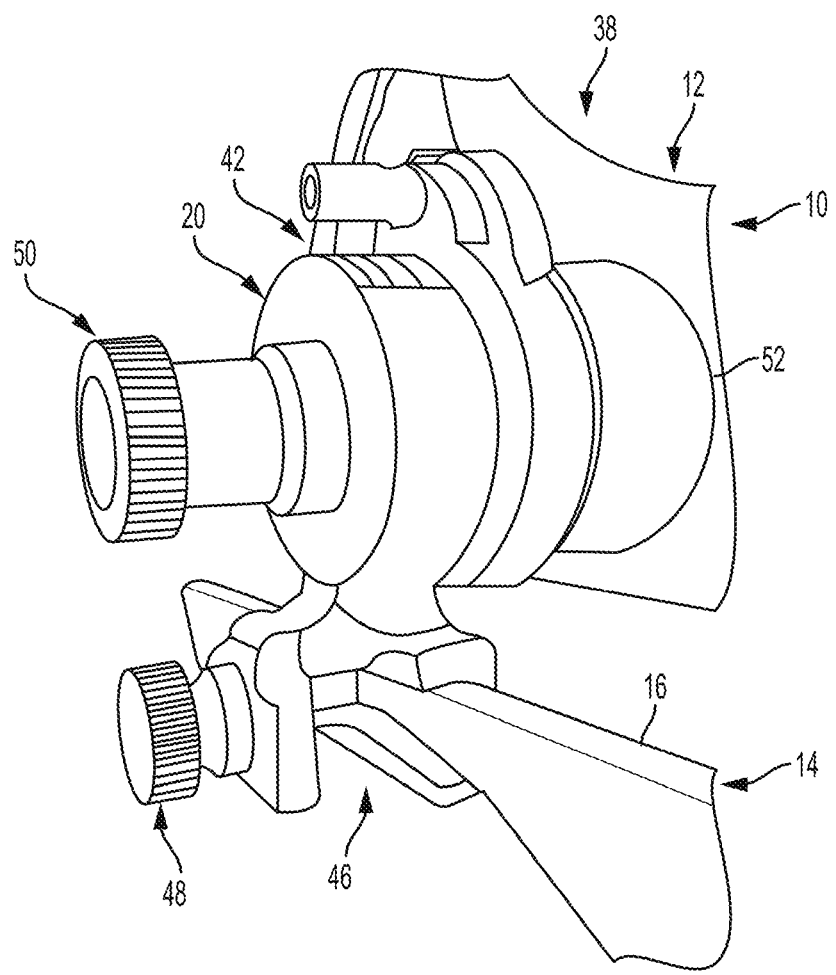
FIG. 10 is another perspective view of the adjustable support assembly.

As shown in FIGS. 5 and 6, heat fins 30 have approximately the same width. As shown in FIG. 7, heat fins 30 have a length that varies with the counter of the lower edge of base 28, which matches the counter of the underside of support assembly 20.

As shown in FIGS. 3-7, heat sink 26 may also include tab/extension 32 that cradles and underside of support assembly 20. In addition to cradling support assembly 20, tab 32 includes a micro USB port 35. Micro USB 35 provides power and data connection points to pod 14 to external sources. As shown in FIG. 5, tab 32 includes a plurality of contacts/connections (female) 36 that align with electrical connection points (male) on support assembly 20. Tab 32 converts the existing power and data connection points of pod 14 to micro USB port 35. Micro USB 35 is connected to pod 14 by soldering the existing data connection points of pod 14 to data and power connection points 36 of tab 32. With micro USB port 35, pod 14 can be charged and communicate/transmit data simultaneously.

According to alternative embodiments of the present disclosure, one or more features of heat sink 26 is not provided. For example, according to one embodiment, heat transfer extension 36 is not provided and/or tab 32 is not provided.

As shown in FIG. 1, wearable display 10 includes adjustable support assembly 20. Support assembly 20 includes a headset base 38, a fastener 40 (see FIG. 11), a pod/visual display base 42, a rubber O-ring 44 positioned between headset base 38 and pod base 42, a clamp 46, partially defined by pod base 42, a screw 48, and knob 50. Other than a portion of fastener 40, most of adjustable support assembly 20 is positioned externally of a headband 52 of headset 12. Fastener 40 includes a head 54 positioned on the interior of headband 52 and a shaft 56 that extends through headband 52 through a hole 58 in headband 52.

Figure 11:
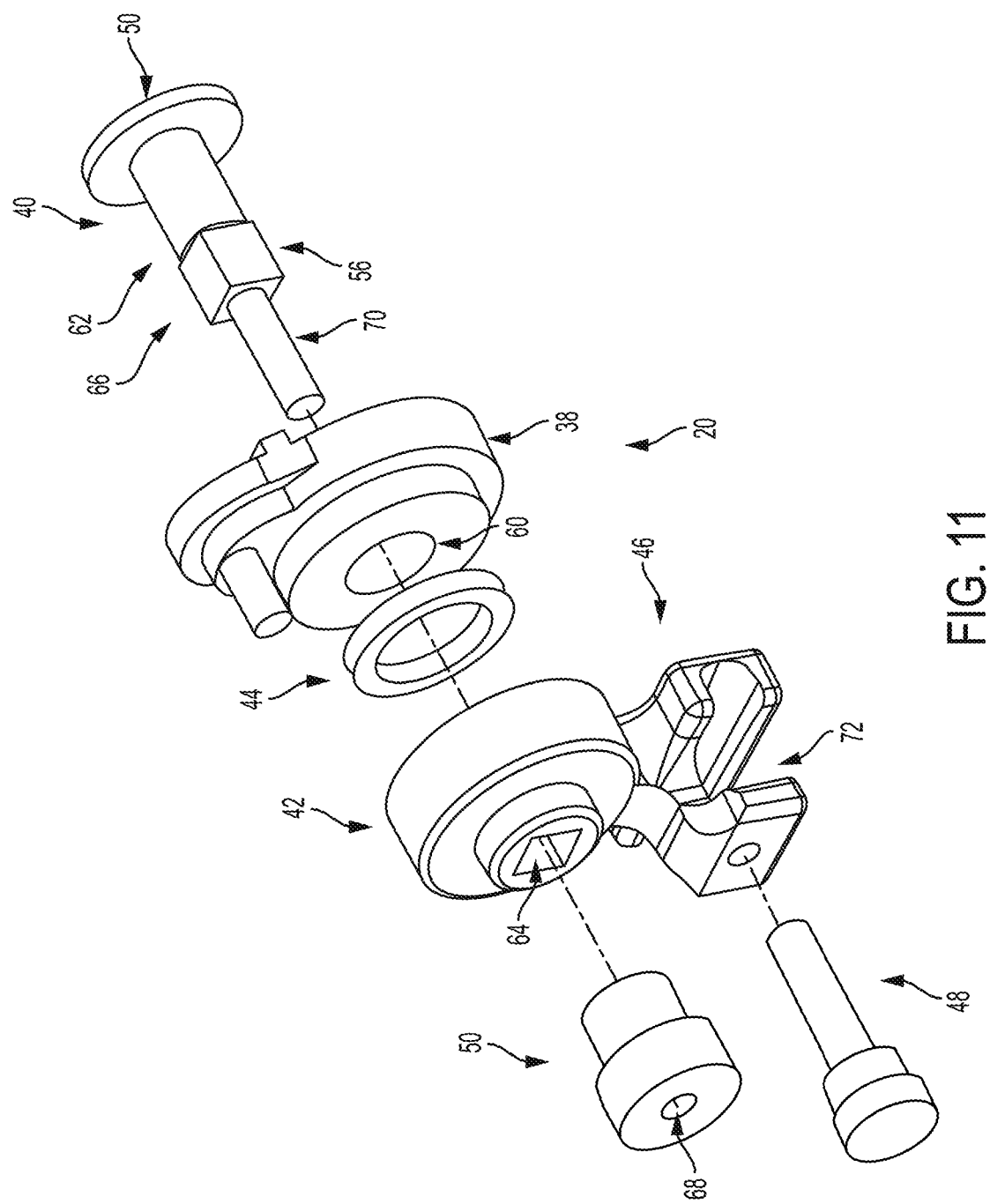
FIG. 11 is an exploded view of the adjustable support assembly.
Figure 12:
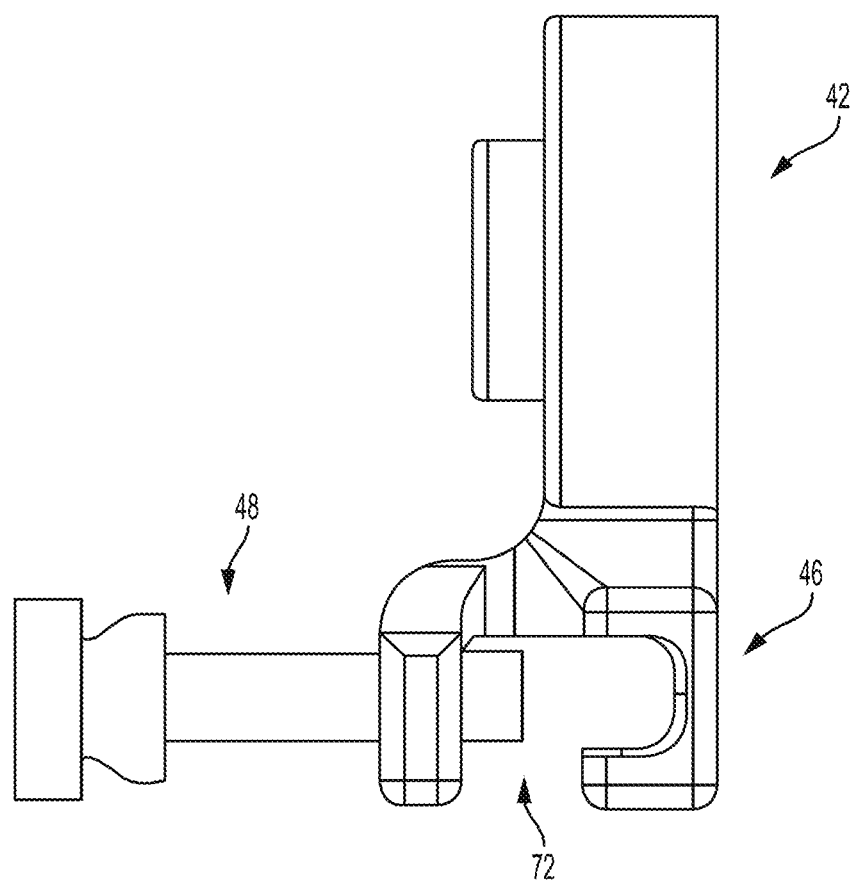
FIG. 12 is a side elevation view of a base of the adjustable support assembly and a screw that clamps the visual display to the headset.
Figure 13:
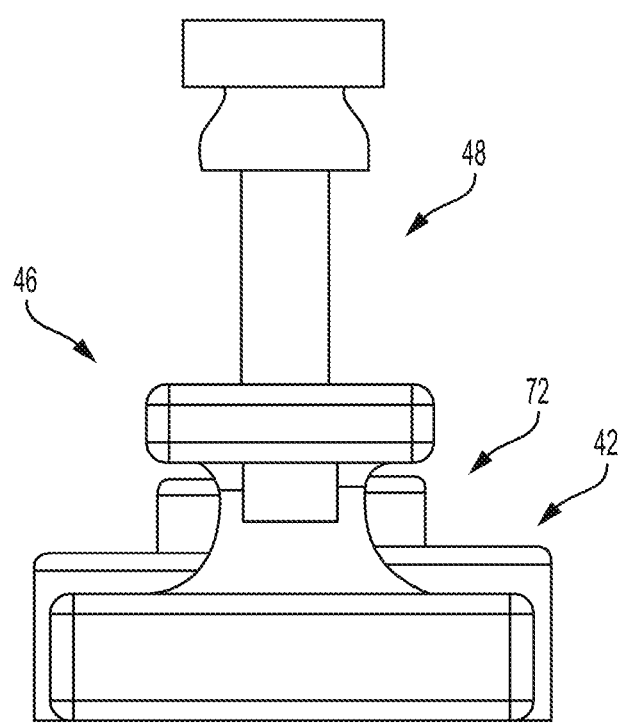
FIG. 13 is a bottom view of the base of FIG. 12.

As shown in FIG. 11, headset base 38 includes a cylindrical bore 60 that receives a cylindrical portion 62 of shaft 56. O-ring 44 is positioned over shaft 56. Pod base 42 includes a square bore 64 that receives a square portion 66 of shaft 56. Knob 50 includes a threaded bore 68 that receives a threaded end 70 of shaft 56.

Figure 14:
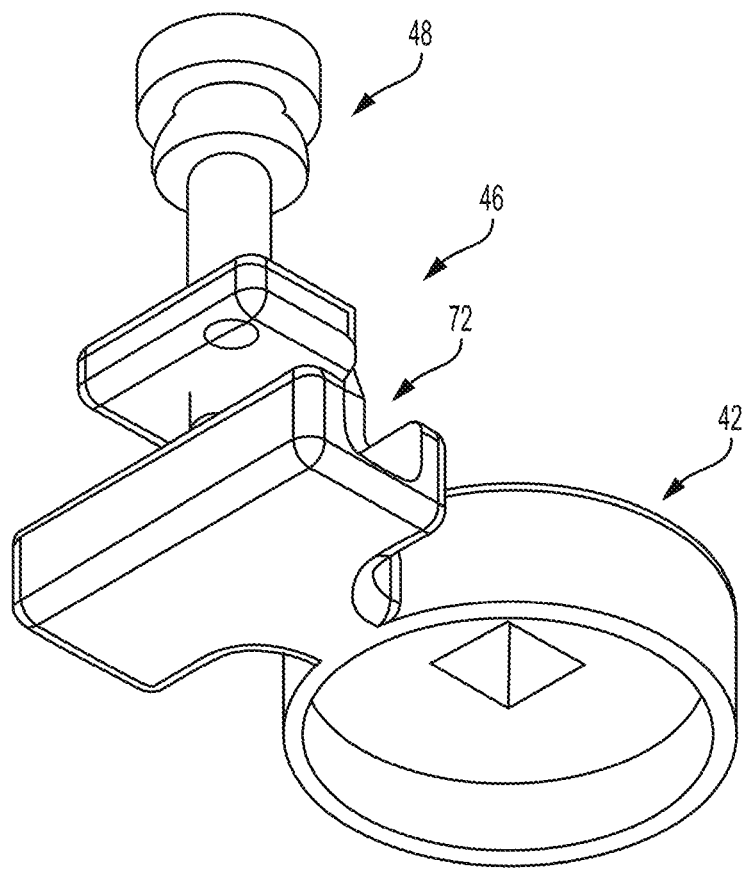
FIG. 14 is a perspective view of the base of FIG. 12.
Figure 15:
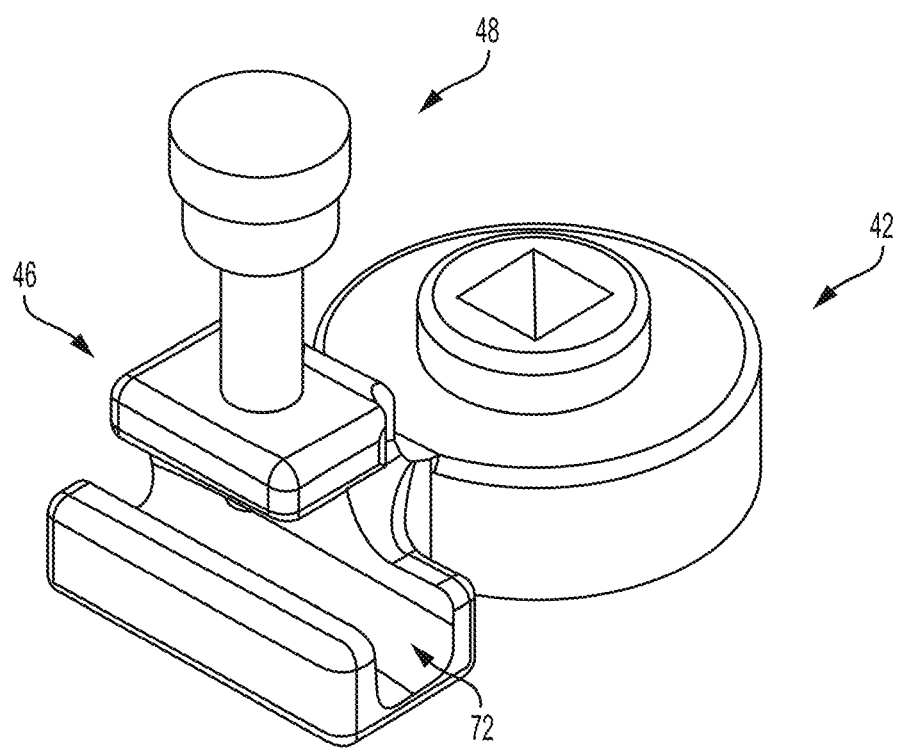
FIG. 15 is another perspective view of the base of FIG. 12.

Clamp 46 defines an opening 72 sized to receive support assembly 20 as shown in FIGS. 14 and 15. Screw 48 extending through clamp 46 into opening 72 and is tightened to secure pod 14 to pod base 42 and therefore headset 12. To adjust the position of pod 14 relative to headset 12 or remove pod 14 from headset 12, screw 48 may be loosened. When repositioned, screw 48 is again tightened. Also during this movement, the direction of camera 19 can be adjusted so that camera 19 can be pointed at a locus of activity, such as a surgical site. The images captured by camera 19 can be transmitted to others for viewing and commentary, if necessary.

During or after use, it may be desirable to move visual display 18 out of the user's field of view or to reposition visual display 18 within the user's field of view. According to the present disclosure, pod 14 with visual display 18 may be rotated about a horizontal axis of rotation relative to headset 12. To rotate pod 14, a user at least partially unscrews knob 50, which relieve compression placed on O-ring 44 and friction provided between headset base 38 and pod base 42 by O-ring 44. By reducing this friction, it is easier/possible to rotate pod 12 relative to headset 12. When pod 14 is in the desired location, knob 50 is tightened so that 0-ring is compressed, creating friction to hold pod 14 in place. If O-ring 44 is decompressed enough, it is possible to apply enough force/torque to pod 14 to overcome the friction created by O-ring 44 without having to loosen knob 50.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practices in the art to which this disclosure pertains.

What is claimed is:

1. A wearable display including
a headset configured to be worn on a user's head;
a visual display assembly including:
    a support body having a thickness and supported by the headset; and
    a visual display supported by the support body to be positioned forward of a user's eye wearing the headset;
an electrical component in communication with the visual display; and
a heat sink in thermal communication with the electrical component, the heat sink including:
    a base on the outer profile of the support body to receive heat from the electrical component; and
    a plurality of heat-dissipating thin-walled sections in thermal communication with and extending distally away from the base in a direction away from the user's head when the headset is worn by the user, to dissipate heat from the electrical component into the environment.

2. The wearable display of claim 1, wherein a plurality of the heat-dissipating thin-walled sections comprising fins, extend distally away from the base by a distance greater than the thickness of the support body.

3. The wearable display of claim 1, wherein the headset comprises a pair of glasses configured to be mounted to the user's head.

4. The wearable display of claim 1, wherein the support body comprises a glass pod.

5. The wearable display of claim 1, wherein each of a plurality of the heat-dissipating thin-walled sections comprising fins, extend distally away from the base to a thin-walled terminus to which nothing is attached.

6. The wearable display of claim 1, wherein the plurality of heat-dissipating thin-walled sections comprising fins, are parallel to each other.

7. The wearable display of claim 1, wherein the plurality of heat-dissipating thin-walled sections comprising fins, are equally spaced apart from each other.

8. The wearable display of claim 1, wherein the plurality of heat-dissipating thin-walled sections comprising fins, extend distally away from the base in a uniform direction perpendicular to the base.

9. The wearable display of claim 1, wherein the plurality of heat-dissipating thin-walled sections comprising fins, are rigid metal.

10. The wearable display of claim 9, wherein the rigid metal comprises aluminum.

11. The wearable display of claim 1, wherein a plurality of the heat-dissipating thin-walled sections comprising fins, are parallel to each other and extend distally away from the base by a distance greater than the thickness of the support body.

12. The wearable display of claim 1, wherein each of a plurality of the heat-dissipating thin-walled sections comprising fins, are parallel to each other and extend distally away from the base to a thin-walled terminus to which nothing is attached.

13. The wearable display of claim 1, wherein each of a plurality of the heat-dissipating thin-walled sections comprising fins, are parallel to each other and are equally spaced apart from each other.

14. The wearable display of claim 1, wherein each of a plurality of the heat-dissipating thin-walled sections comprising fins, are parallel to each other and extend distally away from the base in a uniform direction perpendicular to the base.

15. The wearable display of claim 1, wherein a plurality of the heat-dissipating thin-walled sections comprising fins, are equally spaced apart from each other and extend distally away from the base by a distance greater than the thickness of the support body.

16. The wearable display of claim 1, wherein each of a plurality of the heat-dissipating thin-walled sections comprising fins, are equally spaced apart from each other and extend distally away from the base to a thin-walled terminus to which nothing is attached.

17. The wearable display of claim 1, wherein the plurality of heat-dissipating thin-walled sections comprising fins, are equally spaced apart from each other and extend distally away from the base in a uniform direction perpendicular to the base.

18. The wearable display of claim 1, wherein a plurality of the heat-dissipating thin-walled sections comprising fins, are parallel to each other, are equally spaced apart from each other, and extend distally away from the base by a distance greater than the thickness of the support body.

19. The wearable display of claim 1, wherein a plurality of the heat-dissipating thin-walled sections comprising fins, are parallel to each other, are equally spaced apart from each other, extend distally away from the base by a distance greater than the thickness of the support body, and extend distally away from the base in a uniform direction perpendicular to the base.

20. The wearable display of claim 1, wherein a plurality of the heat-dissipating thin-walled sections comprising fins, are parallel to each other, are equally spaced apart from each other, extend distally away from the base by a distance greater than the thickness of the support body, extend distally away from the base in a uniform direction perpendicular to the base, and extend distally away from the base to a thin-walled terminus to which nothing is attached.

* * * * *